Sept. 18, 1945. E. T. BUCKLEY ET AL 2,384,794
EGG TRANSFER BASKET
Filed Jan. 10, 1944 2 Sheets-Sheet 2

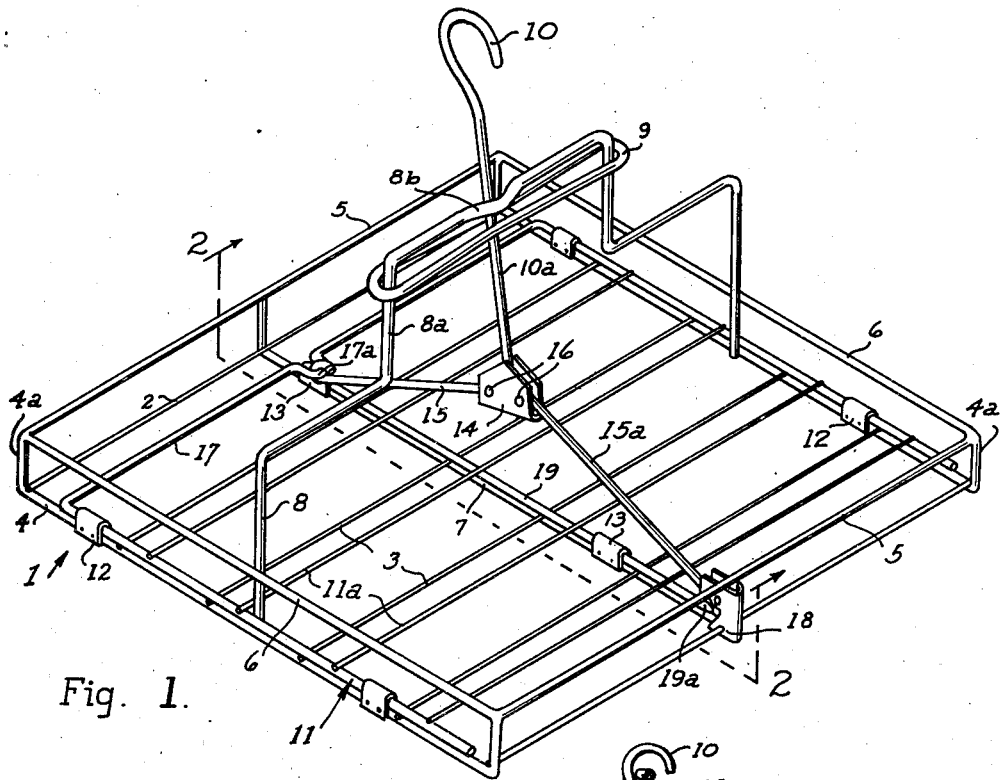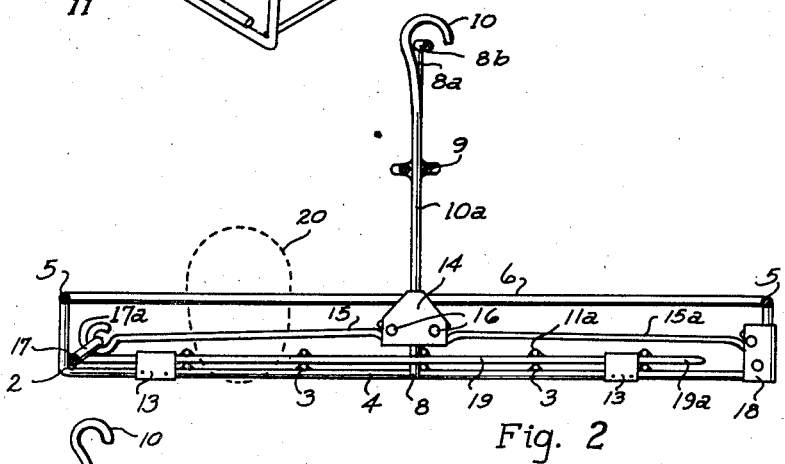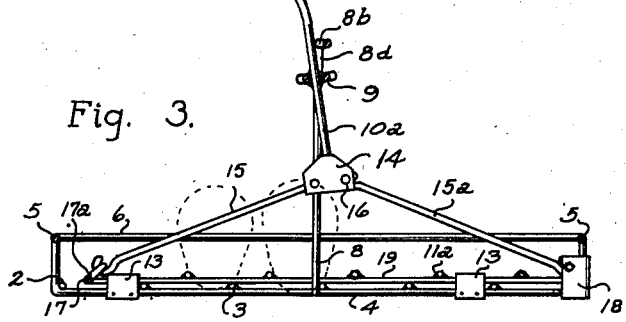

INVENTORS
Earl T. Buckley
Belding E. Richmond
BY
ATTORNEY

Patented Sept. 18, 1945

2,384,794

UNITED STATES PATENT OFFICE 2,384,794

EGG TRANSFER BASKET

Earl T. Buckley, San Diego, and Belding E. Richmond, Chula Vista, Calif., assignors of one-half to Pacific Cooperative Poultry Producers, Portland, Oreg., a corporation of Oregon Application January 10, 1944, Serial No. 517,690

1 Claim. (Cl. 294—87)

The principal object of our invention is to provide an egg transfer basket of simple construction and having a minimum number of moving parts. An incidental object of our invention is to provide a basket of this character which has actuating means associated with the lifting handle so that when the basket is lifted, it causes the transfer basket to retain eggs and when said actuating means is moved downwardly it causes eggs to be released therefrom. This particular feature is important when said basket is used in processing or dipping eggs. That is, said egg transfer basket is adapted to hold a quantity of eggs, usually three dozen, and to lower them into a quantity of oil for processing them and then to carry them for a substantial period of time until said excess oil has dripped from the surface of the egg. Said actuating means tends to arrange the parts so that the eggs will be held within the basket when it is suspended by said drying or dripping mechanism and will permit them to be released when the suspending mechanism is operated in the opposite direction.

A further object of my invention is to provide a basket of this character in which the slatted floor section comprises a plurality of relatively small wires. The small size of the wires in said basket is useful not only to permit said wires to pass easily between rows of eggs in a crate to pick them up and to release them, but also the size and shape of said wires tends to prevent excess oil from flowing from the proximity of said eggs when they are processed.

A further and more particular object of our invention also is to provide an egg transfer basket of this character in which the transverse slatted floor members are arranged in position to retain the eggs in the basket but yet not to underly the centers of said eggs so as to cause them to balance on said wires and to disturb them when they are discharged from said transfer basket. That is, the floor section of said basket is arranged as two relatively movable grids and when the grids of said two sections are in alinement, they are spaced apart sufficiently to pass the sides of eggs either in picking them up or discharging them. When the actuating means causes said transverse members to be moved out of alinement to retain the eggs in the basket, said alining means are positioned and arranged so that said transverse members do not move to a midpoint but lie slightly at opposite sides of said midpoint to straddle the center or point of an egg thus to facilitate the discharge of eggs from said transfer basket.

Further and other details of our invention are hereinafter described with reference to the accompanying drawings, in which:

Fig. 1 is a perspective view of an egg transfer basket embodying our invention in which the two grids forming the floor of said basket are arranged in position to retain eggs therein;

Fig. 2 is a transverse view taken on the line 2—2 in Fig. 1, the floor parts however being moved into alinement so as to permit an egg to pass between the transverse members, respectively, of said floor grids, an egg being shown in dotted outline to illustrate the relation of the parts;

Fig. 3 is a view taken on the same line as Fig. 2 except that said figure is on a slightly reduced scale and said parts are shown as they are arranged in egg retaining position;

Figure 4:
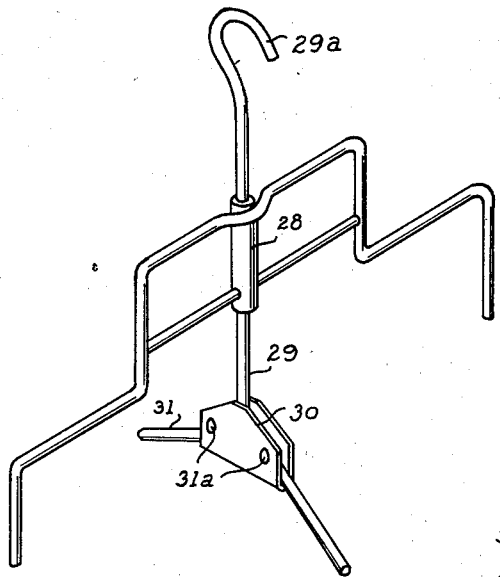
Fig. 4 is a perspective view of the handle and operating parts of a modification of our invention.

An egg transfer basket 1 embodying our invention comprises a tray 2 composed of a plurality of spaced members 3 defining a slatted floor. Said members preferably extend transversely of said tray and secured at their end to two longitudinally extending bounding members 4. Said members present turned up ends 4a and said turned up ends are joined by transverse members 5. Lying in the plane of said transverse members are longitudinal members 6. A central longitudinal member 7 is joined to the spaced members 3 at substantially the middle of the latter and to the transverse members 5 at the ends thereof. Said members 3, 4, 5, 6, and 7 thus define a tray with upturned sides and ends. A handle member 8 is joined to the middle of the bounding member 4 and to the longitudinal members 6. All of said members preferably are welded together so as to define an integral structure. The central part of the handle has an upturned portion 8a formed therein to define a grip. Slidably mounted upon said portion 8a is a loosely fitting link 9. Said link is secured to a vertically extending hook 10.

A slidable grating 11 mounted in clips 12, secured to bounding members 4, holds the grating in overlying sliding relation to the spaced members 3 defining the floor of the tray. Clips 13 also slidably engage the central member 7. A bracket 14 is secured to the lower end of hook 10 and two pitmans 15 and 15a, respectively, which are pivotally secured thereto by pins 16. The end of pitman 15 most distant from bracket 14 is secured to a loop 17a in end member 17 of the grating 11. The end of pitman 15a most distant from bracket 14 is secured to a clip 18 secured to the end of central member 7. Thus when the loop is lowered to the position shown in Fig. 2, the grating is moved toward the left, as viewed in said figure, to cause the members 11a in grating 11 to aline themselves with the members 3 in the tray 2. When the hook is lifted into the position shown in Fig. 3 the pitmans 15, 15a are arranged angularly with respect to the plane of the grating and the bottom of the tray. Then said grating is moved toward the right to cause the members 11a thereof to lie intermediate the spacing of the members 3 of the tray, as is shown in Fig. 3.

A central member 19 of said grating has a pointed end 19a which engages the clip 18 in the manner shown in Fig. 3. The pointed end tends to guide said member into said clip 18 and when the pointed end engages said clip this limits the movement of the grating to the right. Said pointed end 19a is proportioned and positioned with respect to clip 18 so that the grating members 11a do not move to the exact midpoint between the spacing of transverse members 3 and thus the members 11a never underlie the exact point of an egg 20 to be carried in said basket 1. That is, the grating does not move over the slatted floor to such a degree that a member 11a lies immediately under the point of an egg so as to be at "dead center" so to speak. Thus when the hook is lowered to position shown in Fig. 2 the egg is free to slip between the alined members 3 and 11a to discharge an egg through the bottom of said basket. The central handle 18a has a semicircular loop 8b in which the shank 10a of the hook slides so as to limit the angular movement of said hook in moving from the position shown in Fig. 2 to the position shown in Fig. 3.

Figure 6:
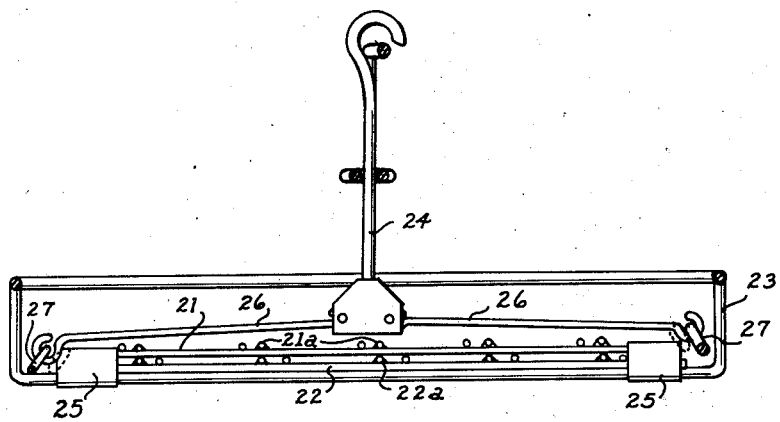
Fig. 6 is a section similar to Fig. 2 of a still further modification of our invention in which both floor grid members are made relatively movable in the basket.

In Fig. 6 we illustrate the manner in which a transfer basket may be formed with two sliding grates 21 and 22 overlying each other. The tray 23 is of the same general conformation as the tray 2 in the embodiment illustrated in Figs. 1 to 3, inclusive, except that no spaced members 3 form a slatted floor for said tray. The grates have slatted members 21a and 22a, respectively, and said grates move equally but oppositely in moving from alinement, as is shown in Fig. 6 when the hook 24 is down, to a position out of alinement when said hook is raised. Said gratings slide in clip 25 secured to the tray and the pitmans 26 are limited in their movement to the range illustrated between the position of the loops 27 in full lines in said Figure 6 to the position shown in dotted lines. Said difference in position represents one-half of the lateral spacing of the grating so that the sum of the shifting of the grating produces the movement from alinement to staggered relationship similar to the movement of the grating over the slatted floor of tray in the embodiment heretofore described.

In Fig. 4 we illustrate a similar type of tray, such as is shown in Fig. 6. That is, the handle and the adjusting means are shown in said figure. A tubular guide 28 closely encompasses shank 29 of hook 29a. The lower end of said hook carries a bracket 30 to which are secured pitmans 31 which are secured about pins 31a. Inasmuch as it is desired to shift the gratings in this type of transfer basket each only one-half of the distance, it is necessary that some means be provided for preventing the shift all occurring in a single grating. This is accomplished in the modification shown in Fig. 4 by holding the movement of hook 29a to purely axial movement. Thus the bracket is lifted straight up and the ends of the pitmans are pulled equally to move the gratings carried thereby an equal distance.

Figure 5:
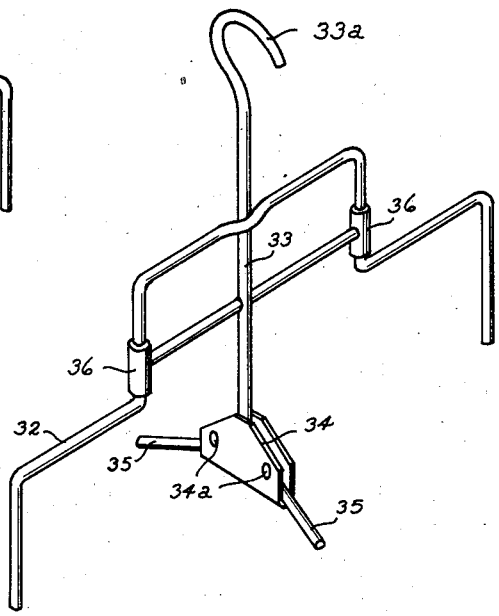
Fig. 5 is a similar view of another modification of our invention.

In Fig. 5 another modification is illustrated A handle 32 has two tubular members 36 mounted thereon and joined to the shaft 33 of hook 33a. The lower end of said hook is secured to a bracket 34 having pins 34a for pivotally securing ends of pitman 35 to said bracket. Axial movement of hook 33a is maintained by the close engagement of the tubular members 36 upon the handle 32 in the same manner as the tubular member 28 holds the hook 29a into vertical or axial movement illustrated and described in connection with the modification shown in Fig. 4. Said tubular members are held in place by a transverse member 37 which joins the tubular members 36 to the shank of hook 33a.

I claim:

An egg transfer basket comprising a tray having a slatted floor section, upstanding marginal portions, and a centrally disposed handle, said slatted floor comprising spaced transverse members, a relatively movable floor member slidably mounted adjacent said slatted floor and including transversely disposed members, and means for moving said slatted floor and said floor member relatively so that the respective transverse members are either arranged in approximate alinement to pass an egg from, or are staggered relatively to retain an egg within said transfer basket, said means including a lifting device and links joining said relatively movable floor member thereto, said means slidably engaging said handle and serving with said handle as a means of lifting said basket, said lifting device and links being arranged to move and to hold said transverse members of the slatted floor and floor member staggered relatively, when said basket is lifted by said device.

EARL T. BUCKLEY.
BELDING E. RICHMOND.